L. L. TATUM.
METER.
APPLICATION FILED MAR. 1, 1913.

1,240,797.

Patented Sept. 18, 1917.
2 SHEETS—SHEET 1.

Witnesses:

Inventor:
Lewis L. Tatum

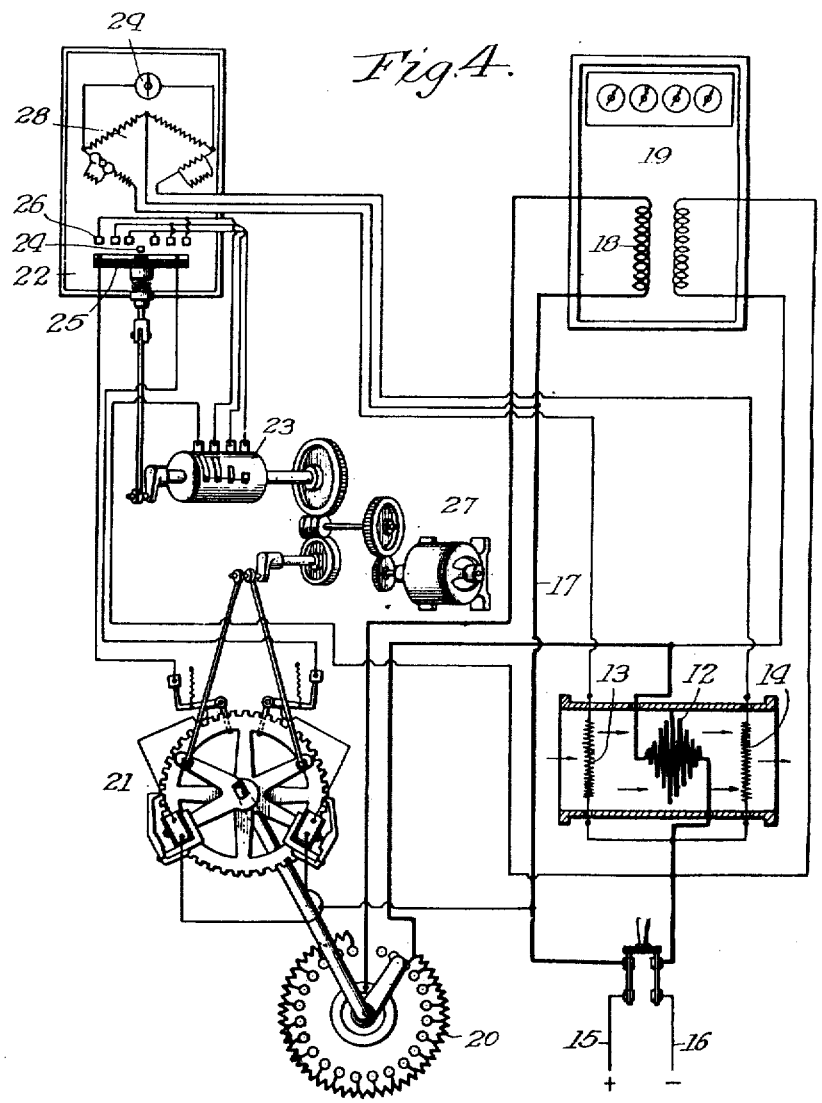

UNITED STATES PATENT OFFICE.

LEWIS L. TATUM, OF MILWAUKEE, WISCONSIN, ASSIGNOR TO THE CUTLER-HAMMER MFG. CO., OF MILWAUKEE, WISCONSIN, A CORPORATION OF WISCONSIN.

METER.

1,240,797.

Specification of Letters Patent.

Patented Sept. 18, 1917.

Application filed March 1, 1913. Serial No. 751,466.

*To all whom it may concern:*

Be it known that I, LEWIS L. TATUM, a citizen of the United States, residing at Milwaukee, in the county of Milwaukee and State of Wisconsin, have invented new and useful Improvements in Meters, of which the following is a full, clear, concise, and exact description, reference being had to the accompanying drawing, forming a part of this specification.

The invention relates to meters.

It relates particularly to thermal fluid meters and to electric thermometer resistances for use therein.
Meters have been devised for measuring the flow of fluids in which heat is dissipated to the flowing fluid and the temperature rise of the fluid measured for determining the rate of flow. The temperature rise is generally measured by two electric thermometers, one arranged in advance of, and the other behind the heater. These thermometers are generally in the form of screens made of resistance wire disposed substantially uniformly across the entire cross-sectional area of the conduit so that the resistance wire tends to assume the average temperature of the flowing fluid. The electrical resistance of the wire depends upon its temperature and thereby affords a basis for determining the temperature of the gas.

If the flow of gas should cease in a meter of this type a certain amount of electrical energy would be consumed uselessly and in some cases the meter elements might be damaged by the excessive temperature resulting from the lack of ventilation of the heating element. It is accordingly important that a meter be provided which will automatically protect itself and avoid useless waste of energy in case the flow of fluid ceases or some other abnormal condition arises.

One of the objects of the present invention is to provide an improved meter in which the heating current is automatically reduced when the fluid ceases to flow.

Another object is to provide an improved meter having resistance thermometers, a part of each of which has a greater electrical resistance than the remaining part, said thermometers being so disposed within the conduit and so functioning as to effect the above mentioned automatic cut-off or reduction of the heating current.

A further object is to provide an improved thermometer resistance for use with a meter of this type.

Other objects and advantages of the invention will hereinafter appear.

The accompanying drawings illustrate an embodiment of the invention. The views of the drawings are as follows:

Fig. 4 is an illustration of the automatic controlling apparatus for the meter.

The electric thermometer resistance used with the meter will first be described.

Figure 1:
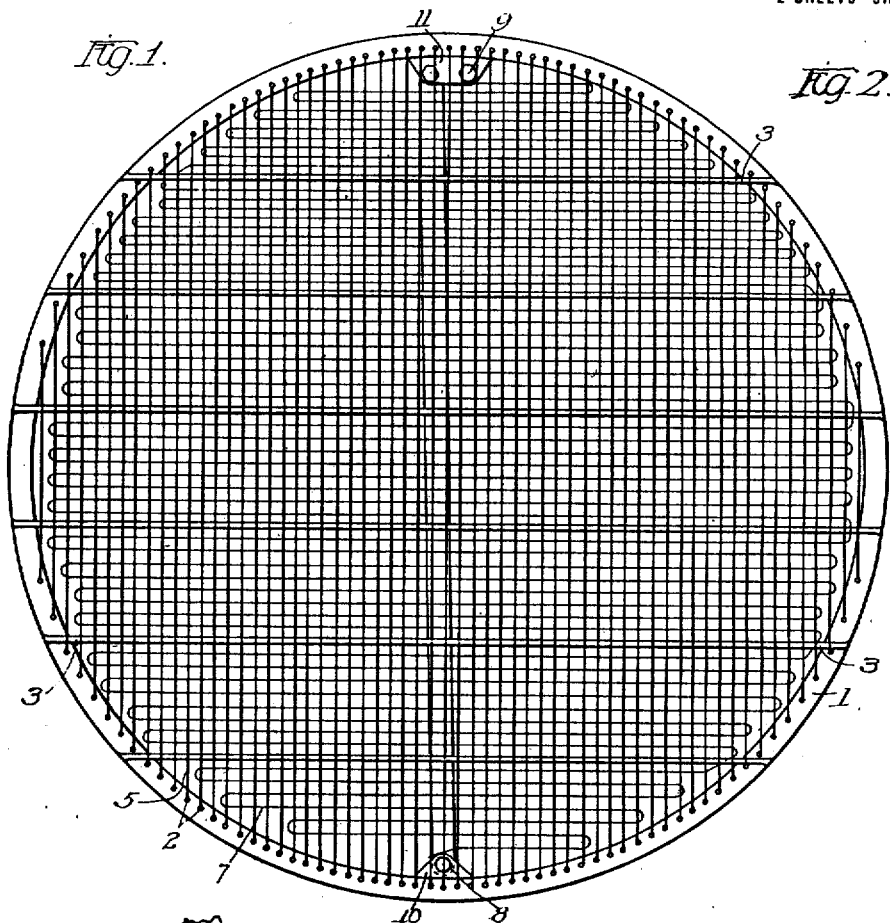
Figure 1 is a side elevation of a thermometer resistance constructed in accordance with my invention.
Figure 2:
Fig. 2 is a sectional elevation of the thermometer shown in Fig. 1.
Figure 3:
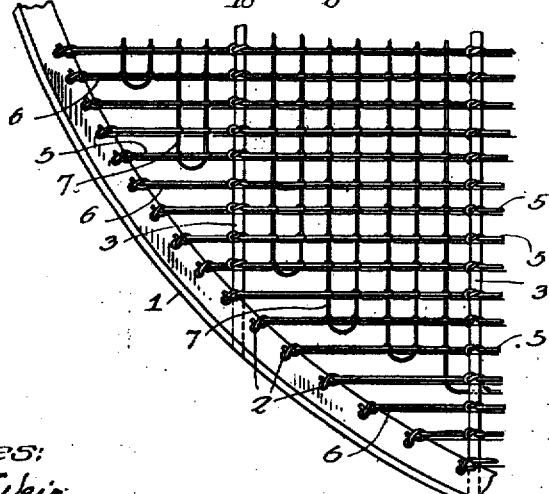
Fig. 3 is an enlarged elevation of a portion of the thermometer shown in Fig. 1.

Said thermometer comprises a circular hoop or frame 1 of angle section, constructed preferably of metal. The inner flange of the frame is provided with a plurality of holes 2, arranged at short intervals around the circumference, as shown particularly in Fig. 1, said frame being provided with stiffening bars 3. The supporting insulating material for the resistance wire is preferably a pure silk cord or line, although it may be any thread or a rod of insulating material suitable for the purpose. The silk cord 5 is stretched at regular intervals across the circular frame, as shown, and is looped through the holes 2 and tied, as shown more clearly in Fig. 3. Said silk cord is also tied to each of the cross supports or stiffening bars 3. These stiffening bars are for the purpose of stiffening the screen as a whole against the blast action of the gases. They serve to shorten the unsupported length of span of the silk cord, each cord being tied where it crosses each support. These stiffeners are preferably spaced not very far apart and are therefore required on even the smallest sizes used commercially.

In order to mount the resistance wire, it is strung back and forth on pins on a temporary circular frame which is placed inside of the thermometer unit frame so that the resistance wire runs at right angles to the supporting silk cord. The wire is then tied to the cord wherever it intersects the latter by a thread, preferably a silk thread, which is smaller than the silk cord. The thread is applied in a convenient manner by starting at the end of each supporting cord, securing it, and then running it alongside the supporting cord and tying a knot around each intersection of resistance wire 7 and silk cord. The silk thread is thus carried across the frame and is tied at the other end of said frame. In this manner, the resistance wire is supported at a very large number of points, the wire and silk cord being secured to each other at each intersection thereof.

After the tying is completed, the entire thermometer, or resistance unit, is dipped in some impregnating material, preferably shellac, which binds the knots in the threads and protects the unit from the chemical action of the gas and from moisture. The ends of the resistance wire 7 are connected to the terminals 8 and 9, respectively, the latter being mounted on insulating blocks 10 and 11, respectively, which are suitably secured to the circular frame 1. The resistance wire, aside from its terminal points of attachment, is out of contact with the circular frame but, at the same time, is well supported thereby, being secured at regular intervals, and insulated therefrom. The resistance wire may be exceedingly fine, that is, of very small mass; and the silk cord and silk thread being also fine, no substantial obstruction is offered to the flow of gas therethrough. Furthermore, as will be apparent, the length of the resistance wire in contact with the supporting cord is very small indeed, the individual contacts being little more than points.

It is desirable ordinarily to have the resistance wire disposed uniformly across the conduit through which the gas flows, in order that the temperature indicated by said resistance wire may represent the average temperature of the flowing gas, particularly where the temperature is not uniform throughout the cross-section. One of the features of the present invention, however, relates to the reducing of the heating current when the gas ceases to flow. Accordingly the resistance of the upper half of the thermometer unit is made greater than that of the lower half. With such an arrangement of a resistance unequally disposed across the flowing stream of gas, the accuracy of operation of the meter, in which such a thermometer is employed, is not affected, provided the gas is flowing at a fair rate therethrough. If the gas should flow very slowly, however, or should cease its flow altogether, then the reading of the thermometer will be affected thereby, the practical use of this feature being hereinafter explained. In the unit illustrated the uneven disposition of the resistance is secured by looping the turns of the resistance wire closer together on one side of the screen than on the other.

It is to be understood that other methods of unequally distributing the resistance wire may be employed. The arrangement of the heater and the thermometer resistances in the meter is illustrated in Fig. 4 in which the heater and the thermometer resistances are shown diagrammatically by the reference numerals 12, 13 and 14 respectively.

The thermometer resistance 13 is arranged in advance of the heater 12. The side of the resistance screen upon which the resistance wire is looped closely together is placed at the bottom of the meter housing or conduit so that the larger amount of resistance is at the bottom of the housing.

The thermometer resistance 14 is located on the opposite side of the heater 12 and is subjected to the flowing fluid after it is heated. The side of the thermometer 14 having the resistance wire looped closely together is placed at the top of the housing or conduit so that the larger amount of resistance of the thermometer 14 is at the top of the housing.

When the fluid being measured is flowing at a substantial rate, the accuracy of the meter is not impaired by the arrangement of the resistance. When the fluid is flowing slowly, however, the temperature indicated by the thermometer 13 will be lower than the average temperature of the fluid at this point and the temperature indicated by the thermometer 14 will be higher than the average temperature of the fluid at the point where the thermometer 14 is located. The reason for this will be apparent when it is borne in mind that when the gas is flowing slowly, and particularly when it ceases to flow altogether and the heat continues to be dissipated from the heating unit, the upper part of the body of gas will be much warmer than the lower part. Consequently the temperature difference as indicated by the two thermometer resistances 13 and 14 will increase when the gas ceases to flow or when it flows very slowly, the construction of the thermometer resistances serving to accentuate this difference. This increase in temperature may be used in various ways to cut off or reduce the current to the heater 12. In the apparatus shown in Fig. 4 the heating current is automatically reduced and then cut off as the difference in temperature between the thermometer resistances 13 and 14 increases. A decrease in the temperature difference between the thermometer resistances also automatically increases the heating current to the heater 12. The automatic controlling apparatus *per se* is described in detail and claimed in the patent to Carl C. Thomas No. 1,222,492 of April 10, 1917. The apparatus will therefore be only briefly described herein.

The electric heater 12 is supplied with current from the mains 15 and 16. The circuit of the heater is from the positive main 15 through the conductor 17, the coil 18 of the watt meter 19, through the adjustable rheostat 20 and the heater 12, to the negative main 16. The rheostat 20 regulates the amount of current flowing to the heater 12 and the watt meter 19 measures the flow of current through the heater.

The rheostat 20 is automatically controlled in response to the temperature difference between the thermometer resistances 13 and 14.

The automatic controlling apparatus comprises in general an electrically-operated step-by-step mechanism 21 controlled by automatically operated switches 22 and 23.

The switch 22 coöperates with a galvanometer needle 24 which is moved in response to the temperature difference between the thermometer resistances. Said switch is provided with a relatively broad contact 25 and a series of contacts 26. Contact 25 is periodically reciprocated by a mechanism driven by an electric motor 27. When the contact 25 is moved upwardly it engages the galvanometer needle 24 between itself and one of said contacts and completes one of the various circuits to the step-by-step mechanism 21 to actuate said mechanism to adjust the rheostat 20. The circuits from the contacts 26 pass through the drum switch 23 which is constructed so that the circuits are broken by the contacts of switch 23 thereby preventing arcing in the switch 22. These various elements are described in more detail in the patent above referred to.

The galvanometer controlling the needle 24 is connected in the Wheatstone's bridge 28 of which the thermometer resistances 13 and 14 form two arms. This Wheatstone's bridge is illustrated diagrammatically in Fig. 4. The thermometers are connected so that for a given temperature difference the needle 24 remains in its central position and the automatic apparatus for adjusting the rheostat remains inactive. Whenever the temperature difference between the thermometers increases or decreases the balance of the Wheatstone's bridge is destroyed and the galvanometer needle moves. Some one of the circuits to the step-by-step mechanism is then completed and said mechanism operated to adjust the rheostat to vary the current to the heater 12. When the temperature difference increases abnormally, as for example, when the gas flows very slowly or ceases to flow altogether, the galvanometer needle is moved to extreme position in one direction and the arm of rheostat 20 is moved around to reduce the current to the heater 12, and finally to break the circuit through the heater, the arm moving to the blank contacts of the rheostat.

It is to be understood that the structure shown is for purposes of illustration only and that other structures may be devised which come within the spirit and scope of the appended claims.

Having thus described my invention, what I claim as new and desire to secure by Letters Patent of the United States is:

1. An electric thermometer resistance comprising a frame, supporting means carried by said frame and a resistor carried by said supporting means and disposed so that the resistance of the area covered by the resistor at one side of the frame is greater proportionally than the resistance of the area covered by the resistor at the other side of the frame.

2. An electric thermometer resistance comprising a frame, supporting means of non-conducting material carried by said frame, and a resistor in the form of a wire doubled back and forth to cover substantially the entire area bounded by said frame, said wire being supported by said supporting means out of contact with said frame, and being disposed so that the resistance of the area covered by the resistor at one side of the frame is greater proportionally than the resistance of the area covered by the resistor at the other side of the frame.

3. An electric thermometer resistance comprising a circular metallic frame, a plurality of parallel non-conducting cords stretched across said frame and spaced at substantially equal intervals, and a reflexed resistance wire secured to said cords, the adjacent turns of said wire being substantially parallel to each other and arranged at right angles to said cords and disposed so that the resistance of a given portion of the area covered by said wire is greater than the resistance of the remainder of said area.

4. An electric thermometer resistance comprising a metallic hoop, a plurality of equally spaced non-conducting cords secured at opposite ends to said hoop, a resistance element comprising a plurality of adjacent lengths of resistance wire substantially parallel to each other and spaced apart, said lengths of resistance wire being arranged to intersect said cords and being tied thereto at each intersection and being so disposed that the resistance of the wire covering a portion of said area is relatively greater than the resistance of the wire covering the remainder of said area.

5. An electric thermometer resistance comprising a frame, a resistance wire supported thereby and insulated therefrom, said wire being so disposed with respect to said frame as to cover substantially the entire area bounded thereby, and being arranged so that the total resistance of said area at one side of the frame is greater proportionally than the resistance of the area at the other side of the frame.

6. In a resistance thermometer, a circular supporting frame, a resistance element supported thereby and covering substantially the entire area bounded by said frame, the resistance of said element over one-half of said area being greater than over the other half thereof.

7. An electric thermometer resistance comprising a screen of resistance wire the total resistance of one-half of which is greater than that of the other half, whereby the thermometer resistance may be made responsive to differences in temperature of different portions of the cross section of a stream of fluid to which the thermometer is subjected.

8. In a resistance thermometer, a plurality of substantially parallel lengths of resistance wire, arranged so that the resistance of a portion of the area covered by said wire is greater than that of the remaining portion, a plurality of substantially parallel supporting non-conducting cords arranged at right angles to said lengths of wire, and a plurality of non-conducting threads, one for each of said cords, said threads being tied around each intersection of said wire and cord.

9. In a meter, a heater, and an electric thermometer adjacent thereto, said thermometer having the form of a wire screen, the resistance of the upper half of said screen being substantially different from the resistance of the lower half.

10. In a meter, a heating element, and a temperature responsive device on each side thereof, one of said devices being responsive to unequal temperatures at different parts thereof.

11. In a meter, an electric heater, an electric thermometer on each side of said heater, each of said thermometers having the form of a wire screen, the resistance of one-half of each screen being greater than the resistance of the other half, said screens being similar but inverted with respect to each other.

12. In a meter, an electric heater, a pair of resistance thermometers arranged one on each side thereof, each thermometer having the form of a wire screen, the resistance of the lower half of one screen being greater than that of the upper half, and the resistance of the upper half of the remaining screen being greater than that of the lower half.

13. In combination, a conduit through which gas flows, an electric heater therein for heating said gas, an electric thermometer arranged in advance of said heater to measure the temperature of the gas before heating, a second electric thermometer arranged behind said heater to measure the temperature of the gas after heating, said heater and said thermometer being so connected with suitable electric controlling devices that the electrical energy supplied to said heater is automatically varied to maintain substantially constant the temperature rise of the gas as indicated by said two thermometers, the resistance of said thermometers being so arranged with respect to the cross-sectional area of said conduit that a higher temperature in the upper part of said conduit will increase the apparent difference of temperature indicated by said thermometers and reduce said energy.

14. In a meter, an electric heater, means for supplying electrical energy thereto, an electric thermometer on opposite sides of said heater, means for varying the electric energy supplied to said heater to maintain substantially a constant temperature difference between said thermometers when gas is flowing therethrough, and means for automatically decreasing the energy dissipated by said heater when the gas ceases to flow.

15. A fluid meter having means for measuring the flow of a stream of fluid by imparting heat thereto and means for automatically decreasing the supply of heat to the heating means when the flow of fluid decreases or ceases.

16. A fluid meter having means for measuring the flow of a stream of fluid by imparting heat thereto and means for automatically shutting off the supply of heat to the heating means when the flow of fluid decreases or ceases.

17. A fluid meter having means for measuring the flow of a stream of fluid by imparting heat thereto by means of an electric heater and means for automatically decreasing the supply of electric energy to the heater when the flow of fluid decreases or ceases.

18. A fluid meter having means for measuring the flow of a stream of fluid by imparting heat thereto by means of an electric heater and means for automatically shutting off the supply of electric energy to the heater when the flow of fluid decreases or ceases.

19. A fluid meter having means for imparting heat to a stream of fluid at a determinable rate, means responsive to the temperature rise of the fluid for controlling the rate at which heat is imparted, said controlling means being adapted to shut off the supply of heat when the flow of fluid ceases.

20. A meter having a housing, heating means therein, temperature responsive means on opposite sides of said heating means, means controlled by said temperature responsive means for regulating automatically the amount of heat dissipated in said housing to maintain constant the temperature rise produced by the heating means, and means for measuring the heat imparted, said regulating means being adapted to automatically shut off the supply of heat when the flow of fluid ceases.

21. A fluid meter having electric heating means for imparting heat to a flowing stream of fluid, means responsive to the temperature rise of the fluid, means regulated by said temperature responsive means for automatically controlling the supply of electrical energy to said heating means and for automatically shutting off said supply when the flow of fluid ceases and means for measuring the electrical energy supplied to the heating means.

In witness whereof, I have hereunto subscribed my name in the presence of two witnesses.

LEWIS L. TATUM.

Witnesses:
FRANK H. HUBBARD,
LEONARD A. WATSON.